United States Patent
Youn et al.

(10) Patent No.: US 10,708,830 B2
(45) Date of Patent: Jul. 7, 2020

(54) METHOD AND CELL FOR DETERMINING HANDOVER OF PDU SESSION

(71) Applicant: LG ELECTRONICS INC., Seoul (KR)

(72) Inventors: Myungjune Youn, Seoul (KR); Hyunsook Kim, Seoul (KR); Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/613,107

(22) PCT Filed: Jun. 5, 2018

(86) PCT No.: PCT/KR2018/006388
§ 371 (c)(1),
(2) Date: Nov. 12, 2019

(87) PCT Pub. No.: WO2018/226006
PCT Pub. Date: Dec. 13, 2018

(65) Prior Publication Data
US 2020/0100147 A1 Mar. 26, 2020

Related U.S. Application Data

(60) Provisional application No. 62/516,087, filed on Jun. 6, 2017.

(51) Int. Cl.
*H04W 36/00* (2009.01)
*H04W 36/14* (2009.01)
*H04W 36/04* (2009.01)

(52) U.S. Cl.
CPC ....... *H04W 36/0058* (2018.08); *H04W 36/04* (2013.01); *H04W 36/14* (2013.01)

(58) Field of Classification Search
CPC ...................................................... H04W 36/30
(Continued)

(56) References Cited

U.S. PATENT DOCUMENTS

2005/0003819 A1\* 1/2005 Wu ................... H04W 36/0066
455/436
2008/0240439 A1\* 10/2008 Mukherjee ............ H04W 12/10
380/272
(Continued)

FOREIGN PATENT DOCUMENTS

WO 2017030343 2/2017

OTHER PUBLICATIONS

PCT International Application No. PCT/KR2018/006388, International Search Report dated Sep. 12, 2018, 4 pages.
(Continued)

*Primary Examiner* — Rafael Pérez-Gutiérrez
*Assistant Examiner* — Frank E Donado
(74) *Attorney, Agent, or Firm* — Lee, Hong, Degerman, Kang & Waimey PC

(57) ABSTRACT

A disclosed feature of the present specification provides a method for a source cell determining a handover of a packet data unit (PDU) session. The method may include a step of determining a target cell or target next generation radio access network (NG-RAN) based on a measurement report by a terminal. A handover region list can additionally be considered in the target cell or target NG-RAN determination step. The method may include a step of transmitting a handover request message that does not include context with respect to the PDU session to the target cell or target NG-RAN, based on the handover region list, if it is confirmed that the determined target cell or target NG-RAN cannot serve for the PDU session.

10 Claims, 18 Drawing Sheets

(58) Field of Classification Search
USPC .......................................................... 455/436
See application file for complete search history.

(56) References Cited

U.S. PATENT DOCUMENTS

| | | | | |
|---|---|---|---|---|
| 2009/0040982 | A1* | 2/2009 | Ho | H04L 1/1874 370/331 |
| 2010/0178920 | A1* | 7/2010 | Kitazoe | H04W 36/0055 455/436 |
| 2011/0045834 | A1* | 2/2011 | Kim | H04L 45/306 455/438 |
| 2012/0264443 | A1* | 10/2012 | Ng | H04W 60/04 455/450 |
| 2014/0078898 | A1* | 3/2014 | Anchan | H04W 28/0268 370/230 |
| 2016/0044559 | A1* | 2/2016 | Xu | H04W 36/0055 370/331 |
| 2016/0127968 | A1* | 5/2016 | Velev | H04W 4/50 370/331 |
| 2018/0199355 | A1* | 7/2018 | Wu | H04W 36/0066 |
| 2019/0191348 | A1* | 6/2019 | Futaki | H04W 36/0033 |
| 2019/0208465 | A1* | 7/2019 | Mihaly | H04W 8/26 |
| 2019/0246375 | A1* | 8/2019 | Ke | H04W 68/00 |
| 2019/0320355 | A1* | 10/2019 | Da Silva | H04W 16/28 |
| 2020/0029388 | A1* | 1/2020 | Dao | H04W 76/27 |

OTHER PUBLICATIONS

Qualcomm, et al., "TS 23.501: PDU sessions handling for LADNs", 3GPP SA WG2 Meeting #121, S2-173110, May 2017, 7 pages.

Qualcomm, et al., "TS 23.502: PDU sessions handling for LADNs", 3GPP SA WG2 Meeting #121, S2-173111, May 2017, 35 pages.

Samsung, et al., "TS 23.502—Update 4.3.2 PDU Session establishment for LADN", 3GPP SA WG2 Meeting #121, S2-172939, May 2017, 8 pages.

Qualcomm, et al., "TS 23.501: Clarification on mechanisms for LADN support", 3GPP SA WG2 Meeting #121, S2-173836, May 2017, 8 pages.

* cited by examiner

METHOD AND CELL FOR DETERMINING HANDOVER OF PDU SESSION

CROSS-REFERENCE TO RELATED APPLICATIONS

This application is the National Stage filing under 35 U.S.C. 371 of International Application No. PCT/KR2018/006388, filed on Jun. 5, 2018, which claims the benefit of U.S. Provisional Application No. 62/516,087, filed on Jun. 6, 2017, the contents of which are all hereby incorporated by reference herein in their entirety.

BACKGROUND

Field of the Disclosure

The present disclosure relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the |

TABLE 1-continued

| REFERENCE POINT | DESCRIPTION |
|---|---|
| | 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point correspondsto Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 illustrates a structure of the next generation mobile communication.

As may be seen from FIG. 2, a base station of the next generation mobile communication is referred to as gNB. The gNB is connected to Access and Mobility Management Function (AMF) and User Plane Function (UPF).

The Next Generation Radio Access Network (NG-RAN) in the figure is composed of gNBs. And the Next Generation Core (NGC) includes the AMF/UPF.

The interface between the gNBs is referred to as Xn interface.

FIG. 3 is an exemplary diagram illustrating a predicted structure of a next generation mobile communication in terms of a node.

Referring to FIG. 3, the UE is connected to a data network (DN) through a next generation RAN (Radio Access Network).

The Control Plane Function (CPF) node shown in FIG. 3 may perform all or a part of the MME (Mobility Management Entity) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The PCF (Policy Control Function) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like an HSS (Home Subscriber Server) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

On the other hand, in a situation where the UE roams on a visited network, for example, a V-PLMN, there are two schemes for processing a signaling request from the UE. In the first scheme, that is, LBO (local break out) scheme, the visited network handles the signaling request from the UE. According to the second scheme, that is, Home Routing (HR) scheme, the visited network transmits a signaling request from the UE to the home network of the UE.

FIG. 4a is an exemplary diagram illustrating an architecture to which a local breakout (LBO) scheme is applied when the UE is roaming; FIG. 4b is an exemplary diagram illustrating an architecture to which a home routing (HR) scheme is applied when the UE is roaming.

As shown in FIG. 4a, in the architecture to which the LBO scheme is applied, user data is transmitted to a data network (DN) in the VPLMN via the UPF node in the VPLMN. And in the architecture to which the LBO scheme is applied, a PCF node in the VPLMN performs interaction with an AF node to generate a PCC rule for a service in the VPLMN. The PCF node in the VPLMN creates the PCC rule based on a built-in policy according to the roaming agreement with the HPLMN provider.

As shown in FIG. 4b, in the architecture to which the HR scheme is applied, user data is transmitted to the data network in the HPLMN after being transmitted to the UPF node in the HPLMN via the UPF node in the VPLMN.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 5A is an exemplary diagram illustrating an example of an architecture for implementing the concept of network slicing.

As can be seen from FIG. 5A, the core network (CN) may be divided into several slice instances. Each slice instance may contain one or more of a CP function node and a UP function node.

Each UE may use a network slice instance corresponding to its service through RAN.

Unlike the case shown in FIG. 5A, each slice instance may share one or more of a CP function node, and a UP function node with another slice instance. This will be described with reference to FIG. 5B below.

FIG. 5B is an exemplary view showing another example of an architecture for implementing the concept of network slicing.

Referring to FIG. 5B, a plurality of UP function nodes are clustered, and a plurality of CP function nodes are also clustered.

Further, referring to FIG. 5B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Interworking with Legacy 4th Generation Mobile Communication System>

Even if the UE leaves the coverage of the next generation RAN (Radio Access Network), the UE must be able to receive service via a 4G mobile communication system. This is called interworking. Hereinafter, interworking will be described in detail.

FIG. 6A shows an architecture for interworking when the UE is not roaming, and FIG. 6B shows an architecture for interworking when the UE is roaming.

Referring to FIG. 6A, when the UE does not roam, E-UTRAN and EPC for legacy 4th generation LTE, and 5th generation mobile communication network may be interworked with each other. In FIG. 6A, a packet data network gateway (PGW) for a legacy EPC is divided into a PGW-U, which is responsible for only the user plane, and a PGW-C, which is responsible for the control plane. Moreover, the PGW-U is merged into the UPF node of the fifth-generation core network, and the PGW-C is merged into the SMF node of the fifth-generation core network. Moreover, the Policy and Charging Rules Function (PCRF) for the legacy EPC may be merged into the PCF of the 5th generation core network. Moreover, the HSS for the legacy EPC may be merged into the UDM of the 5th generation core network. The UE may access the core network through the E-UTRAN. Alternatively, the UE may access the core network through the 5G radio access network (RAN) and the AMF.

Referring to FIGS. 6A and 6B while comparing FIGS. 6A and 6B, when the UE roams on a Visited Public Land Mobile Network (VPLMN), the data of the UE is delivered via the Home PLMN (HPLMN).

Meanwhile, the N26 interface shown in FIGS. 6A and 6B refers to an interface connected between the MME and the AMF node to facilitate interworking between the EPC and the NG core. This N26 interface may be selectively supported depending on the network operator. That is, for interworking with the EPC, the network operator may provide the N26 interface or may not provide the N26 interface.

<LADN (Local Area Data Network)>

On the other hand, in the next generation (i.e., fifth generation) mobile communication, it is considered to provide a local area service (or a specialized service for each geographical area). This local service is considered to be called as LADN in the next generation mobile communication.

However, there is a problem that a handover procedure for a Packet Data Unit (PDU) session for the LADN is unclear.

SUMMARY OF THE DISCLOSURE

Therefore, the present disclosure is intended to provide an efficient handover processing method for a PDU session in the LADN.

To achieve the objective above, one embodiment of the present disclosure provides a method for a source cell determining a handover of a Packet Data Unit (PDU) session. The method may comprise determining a target cell or a target Next Generation Radio Access Network (NG-RAN) based on a measurement report of a UE. In determining the target cell or the target NG-RAN, a handover region list may be additionally considered. The method may include transmitting a handover request message that does not include context with respect to the PDU session to the target cell or the target NG-RAN, based on the handover region list, if it is confirmed that the determined target cell or target NG-RAN is unable to service the PDU session.

The PDU session may be used for a Local Area Data Network (LADN).

The handover request message may be transmitted for a handover procedure using Xn interface.

The handover region list may be configured for each PDU session.

The handover region list may include information about a region in which handover is limited or allowed with respect to the corresponding PDU session.

The method may further include obtaining the handover region list from an AMF or Session Management Function node during a PDU session establishment procedure.

The method may further include deleting context with respect to the PDU session, based on the handover region list, if it is confirmed that the determined target cell or target NG-RAN is unable to service the PDU session.

The determining the target cell or target NG-RAN may include confirming a handover region list with respect to each PDU session in the presence of a plurality of handover region lists; and selecting a target cell or a target NG-RAN to which a plurality of PDU sessions may all be handed over, based on the plurality of handover region lists.

The plurality of handover region lists may be confirmed in order of priority.

In the absence of a target cell or a target NG-RAN to which the plurality of PDU sessions may all be handed over, a handover region list with a low priority may be excluded from use.

To achieve the objective above, one embodiment of the present disclosure provides a cell that determines handover of a Packet Data Unit (PDU) session. The cell may comprise a transceiver; and a processor determining a target cell or a target NG-RAN based on a measurement report of a UE. In determining the target cell or the target NG-RAN, a handover region list may be additionally considered. The processor may transmit a handover request message that does not include context with respect to the PDU session to the target cell or the target NG-RAN, based on the handover region list, if it is confirmed that the determined target cell or target NG-RAN is unable to service the PDU session.

According to the disclosure of the present disclosure, the problem of the conventional technology described above may be solved.

DESCRIPTION OF EXEMPLARY EMBODIMENTS

Figure 1:
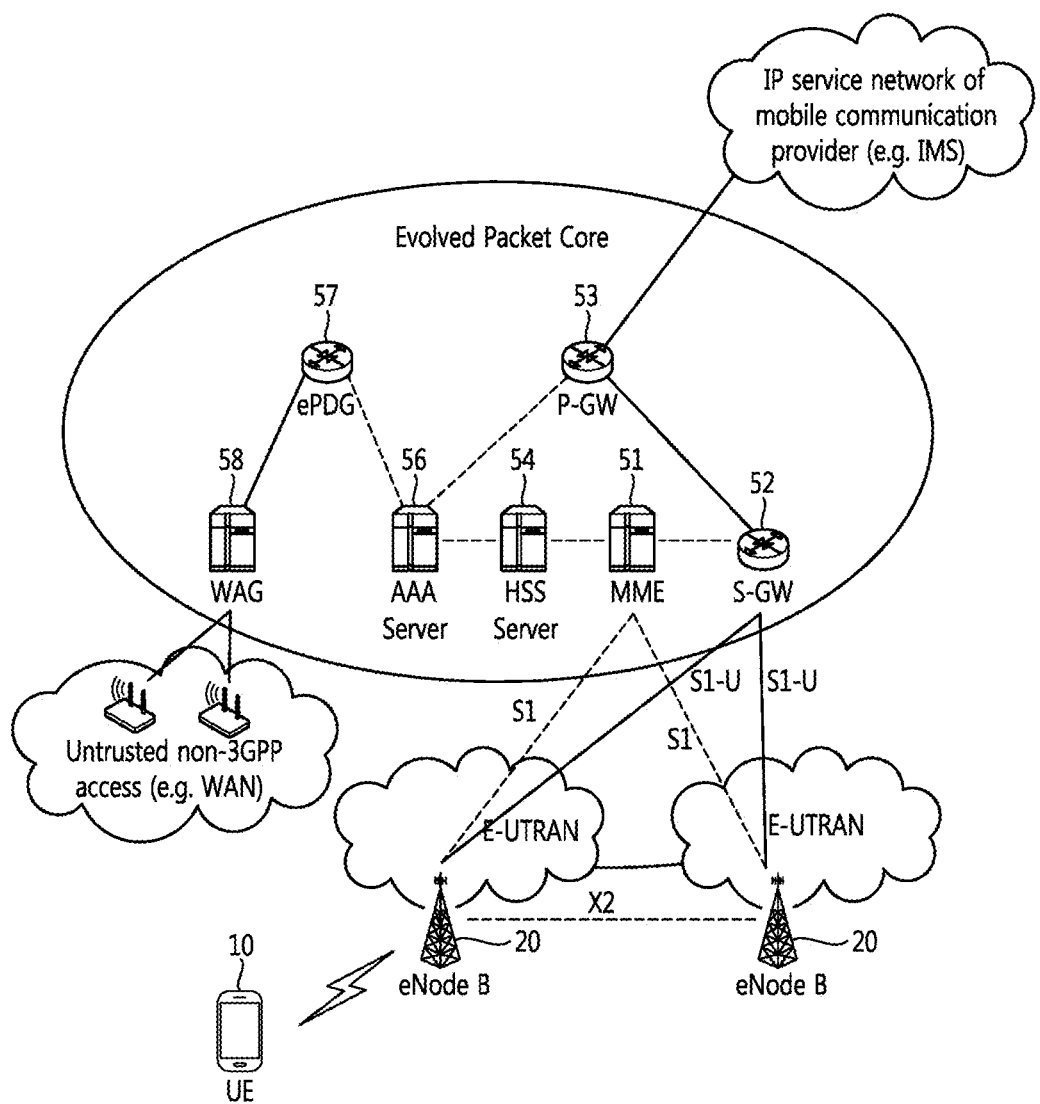
FIG. 1 shows the configuration of an evolved mobile communication network.
Figure 2:
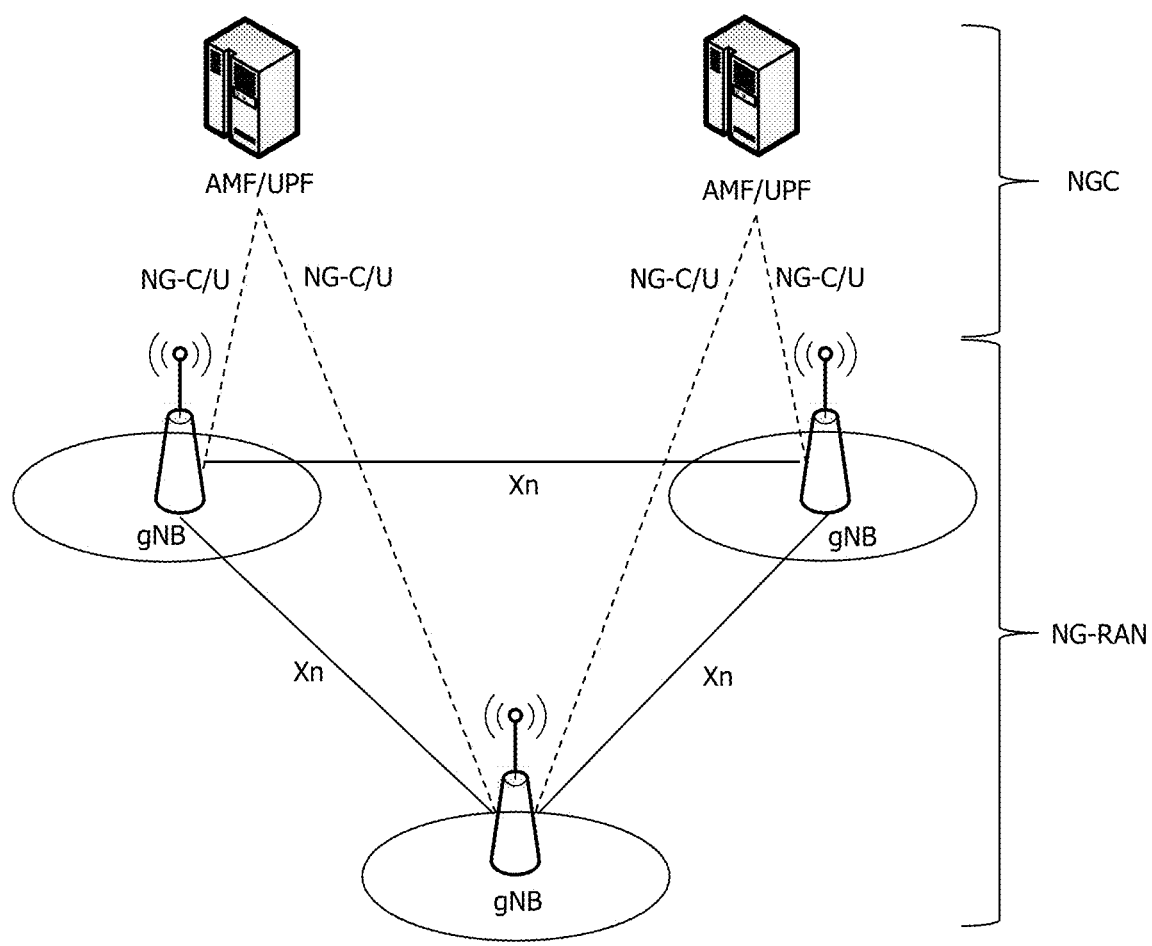
FIG. 2 illustrates a structure of the next generation mobile communication.
Figure 3:
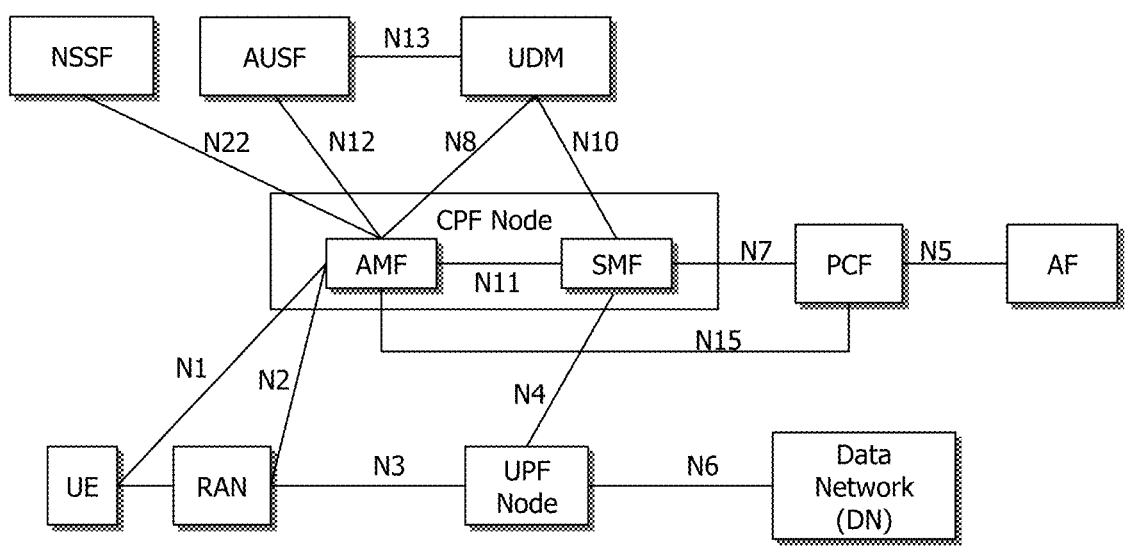
FIG. 3 is an exemplary diagram illustrating a predicted structure of a next generation mobile communication in terms of a node.
Figure 4A:
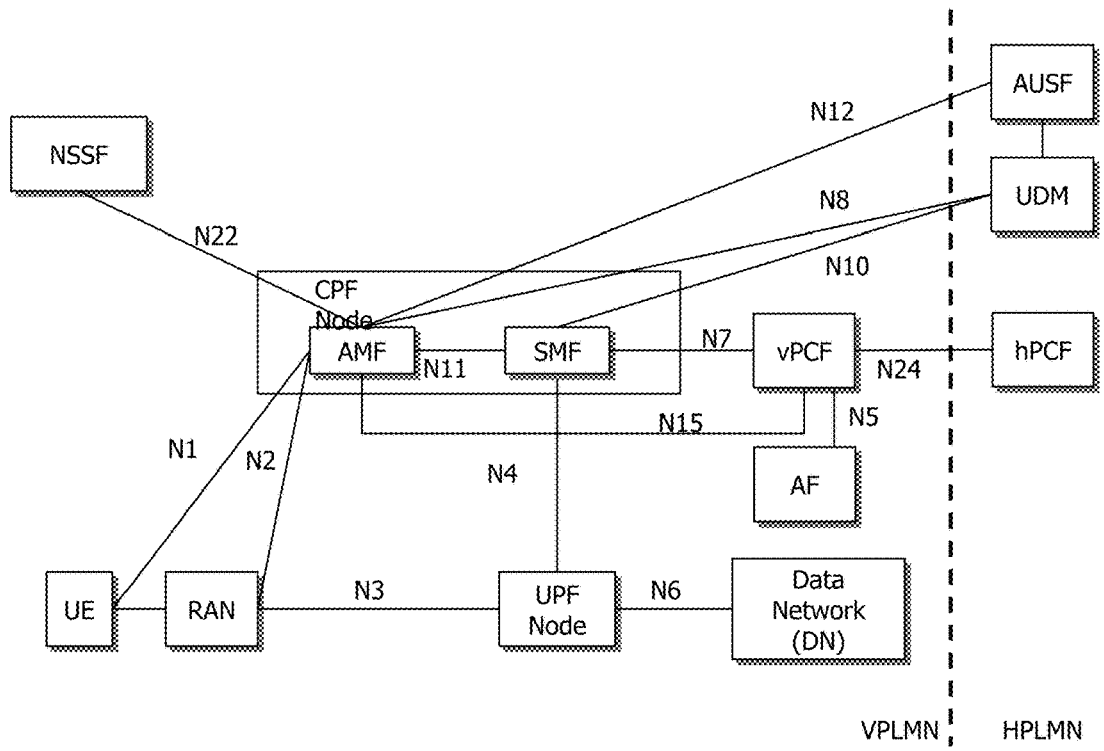
FIG. 4A is an exemplary diagram illustrating an architecture to which a local breakout (LBO) scheme is applied when roaming.
Figure 4B:
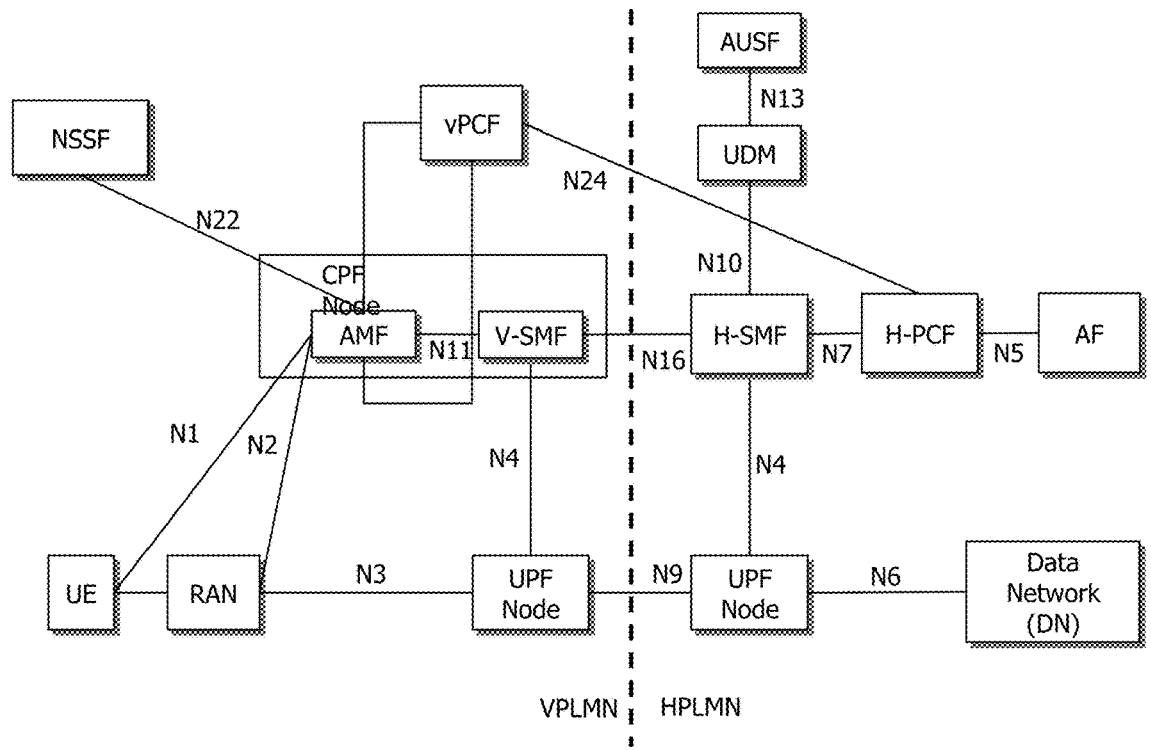
FIG. 4B is an exemplary diagram illustrating an architecture to which an HR (home routed) scheme is applied when roaming.
Figure 5A:
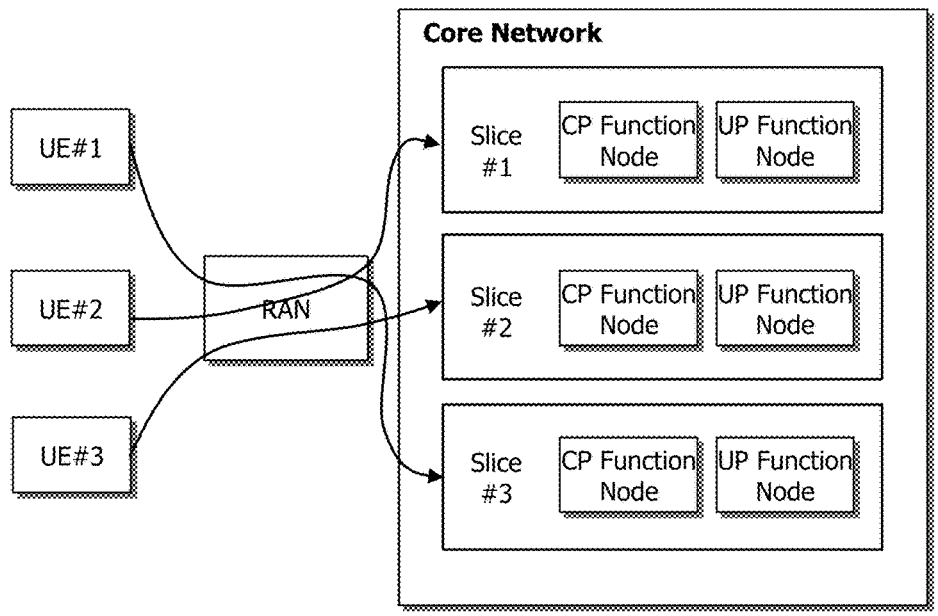
FIG. 5A is an exemplary diagram illustrating an example of an architecture for implementing the concept of network slicing.
Figure 5B:
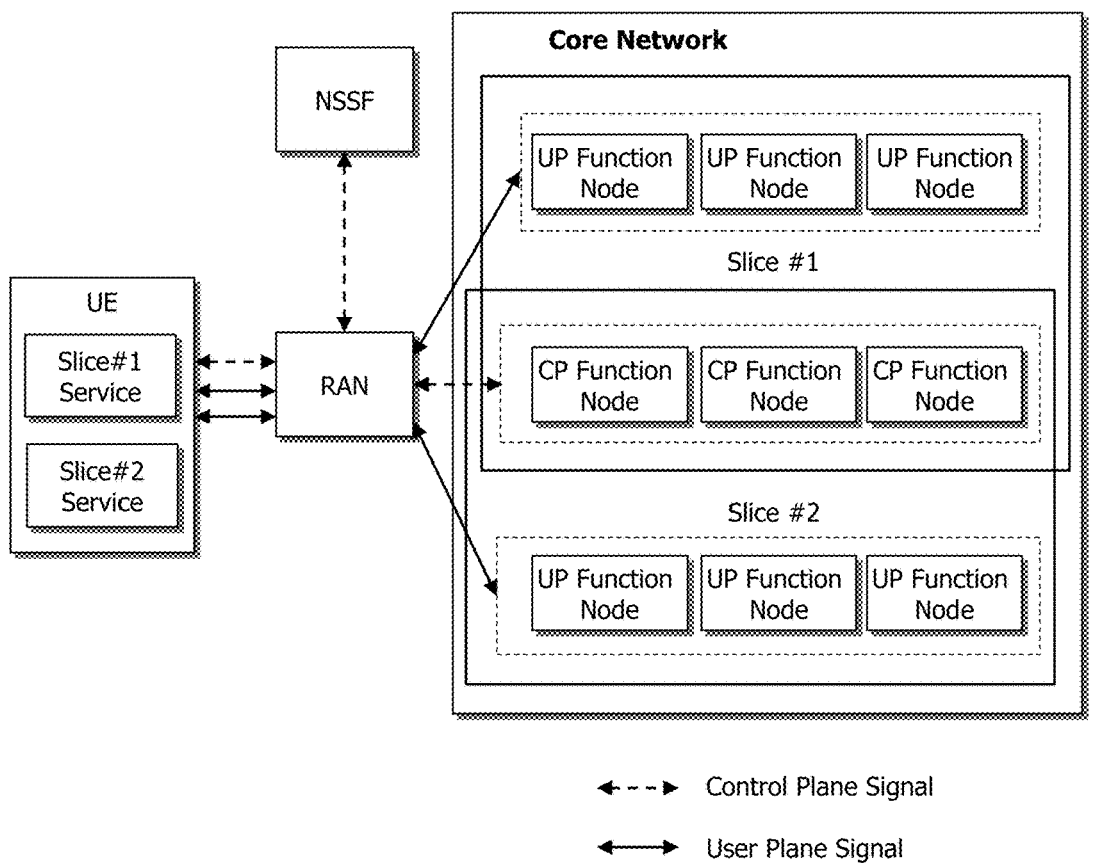
FIG. 5B is an exemplary view showing another example of an architecture for implementing the concept of network slicing.
Figure 6A:
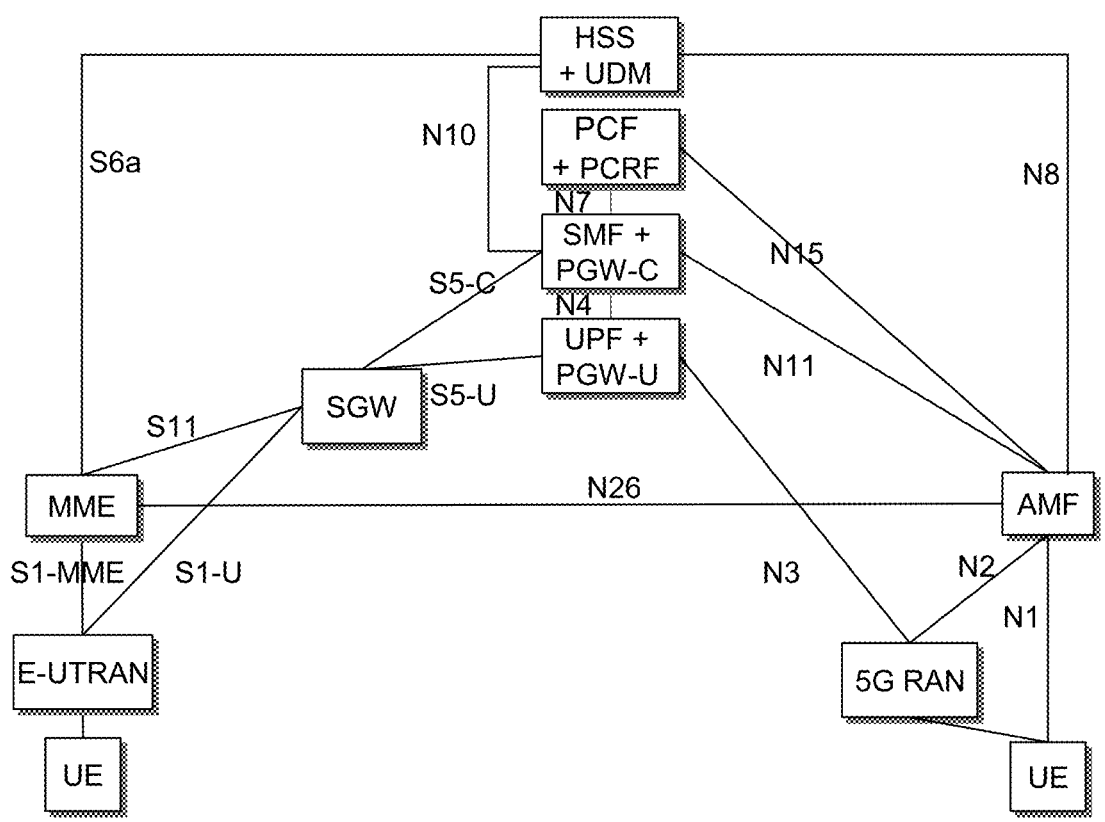
FIG. 6A shows an architecture for interworking when the UE is not roaming.
Figure 6B:
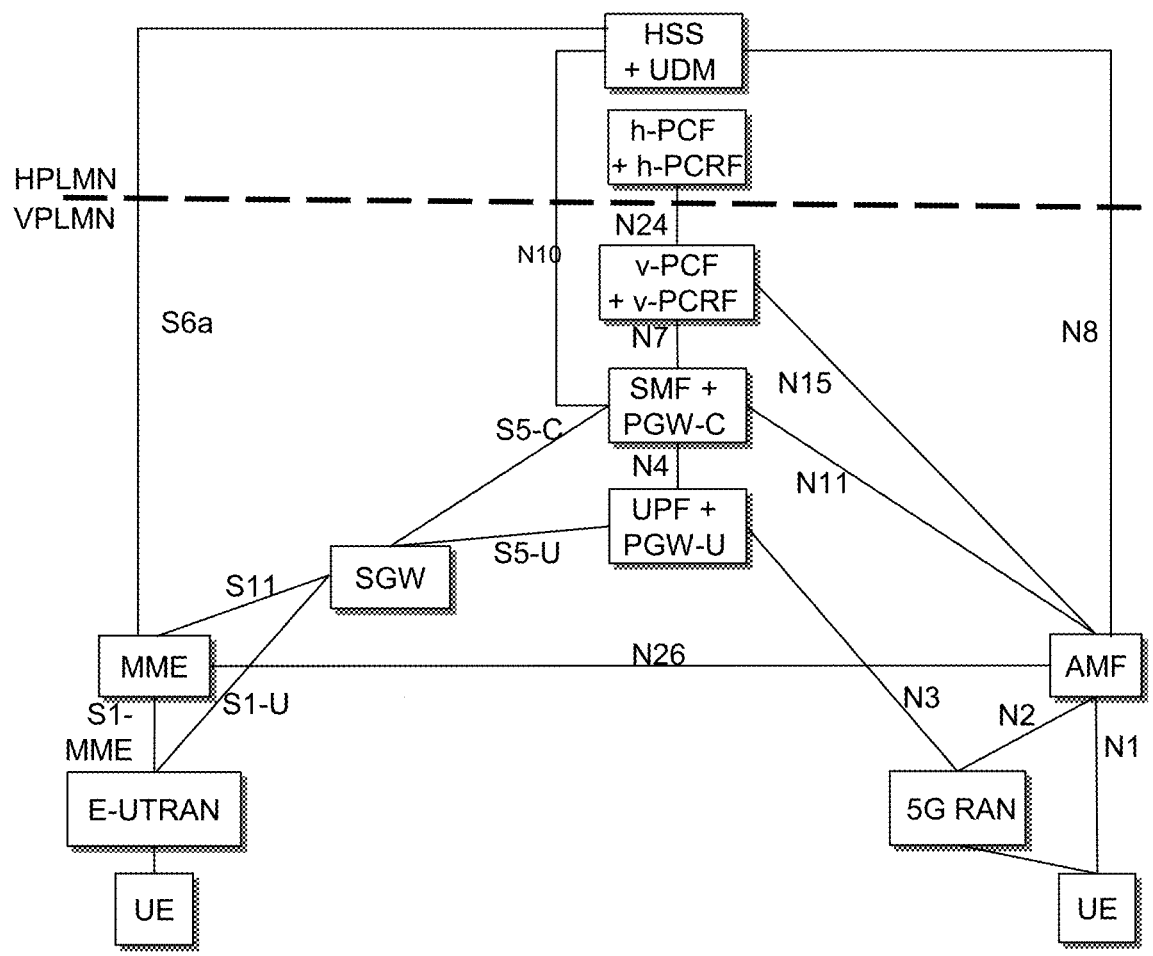
FIG. 6B shows an architecture for interworking when the UE is roaming.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

<LADN (Local Area Data Network)>

In the next generation (i.e., fifth generation) mobile communication, it is considered to provide a local area service (or a specialized service for each geographical area). This local service is considered to be called as LADN in the next generation mobile communication.

Figure 7:
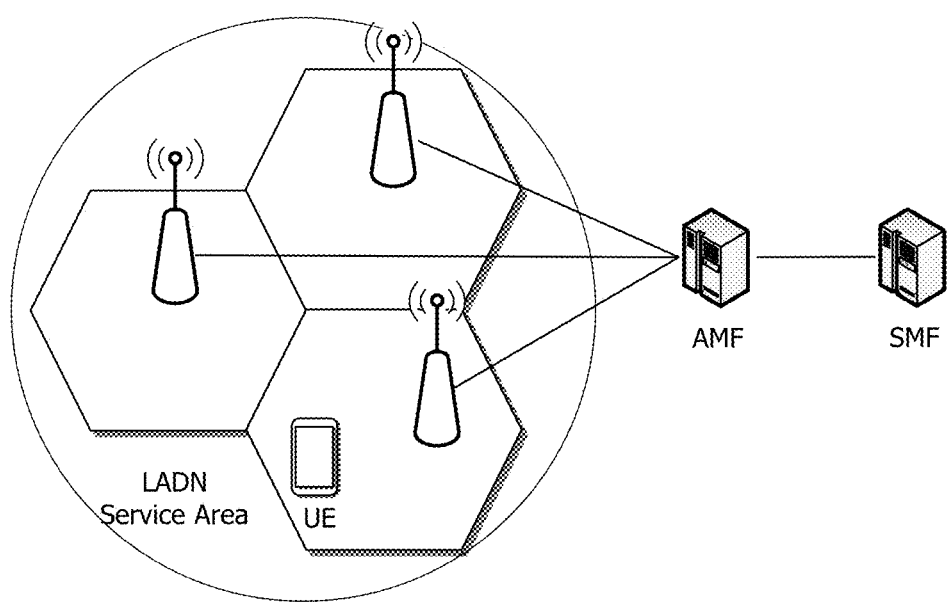
FIG. 7 illustrates an example of an LADN service.

FIG. 7 illustrates an example of an LADN service.

As may be known from FIG. 7, if a UE is located in a predetermined service region, the UE may receive an LADN service. To this purpose, if the UE enters the predetermined service region, the UE may generate a Packet Data Unit (PDU) session with respect to the LADN.

Figure 8:
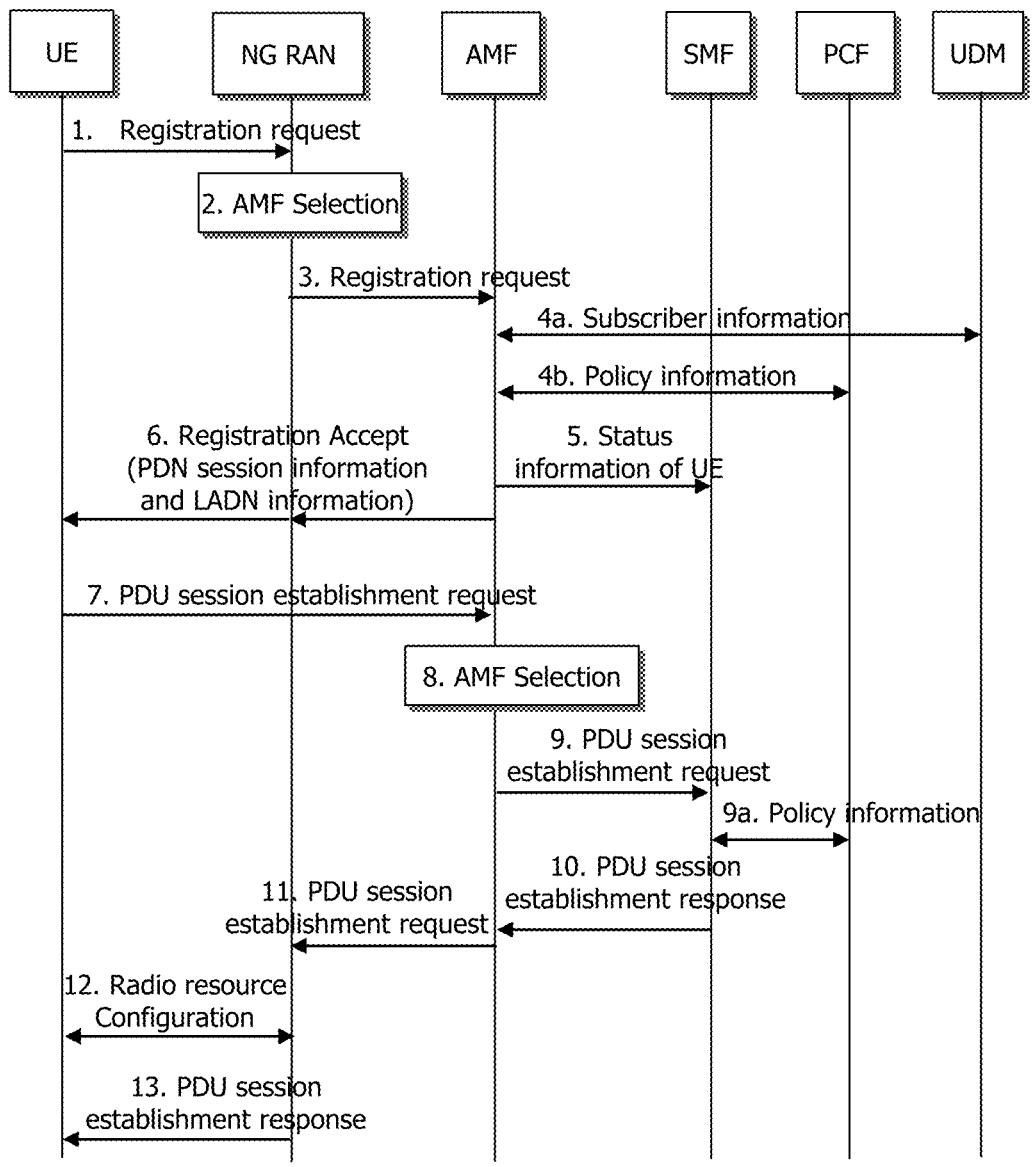
FIG. 8 illustrates a registration procedure and a PDU session establishment procedure.

FIG. 8 shows a registration procedure and a PDU session establishment procedure.

1) Referring to FIG. 8, the UE transmits a registration request message to the base station of the NG RAN. If there is a previously established PDU session by the UE, the UE may include information on the previously established PDU session in the registration request message.

2) Then, the base station of the NG RAN selects an AMF node.

3) Moreover, the base station of the NG RAN transmits the registration request message to the selected AMF node.

4) The AMF node obtains the subscriber information of the UE from the UDM. In addition, the AMF node obtains policy information from the PCF.

5) Moreover, the AMF node transmits to the SMF node the status information of the UE (i.e., information indicating that the UE is now able to receive a signal).

6) The AMF node transmits a Registration Accept message to the UE. At this time, if there is a previously established PDU session, the registration accept message may include information about the PDN session. Further, if the UE is subscribed to the LADN service, the AMF node may include the LADN information into the registration accept message. The LADN information may include LADN identification information and information about LADN service valid within a pre-registered geographical area. Further, the LADN information may include information on the pre-registered geographical area.

7) Meanwhile, if there is no PDU session previously established by the UE, the UE transmits a PDU session establishment request message to the AMF node through the NG RAN.

8) The AMF node selects an SMF node for the UE.

9) Moreover, the AMF node transmits a PDU session establishment request to the SMF node.

9a) The AMF node obtains policy information about session establishment from the PCF node.

10 to 12) Upon receiving a PDU session establishment response message from the SMF node, the AMF node transmits a PDU session establishment request to the base station of the NG RAN. Thus, the base station of the NG RAN establishes radio resources.

13) The base station of the NG RAN transmits the PDU session establishment response message to the UE.

Meanwhile, although not shown, if there is a PDU session previously established by the UE, the UE may transmit a service request message instead of the PDU session establishment request message in the step 7 above.

<Handover in the Next Generation Mobile Communication>

In the fifth generation (so-called 5G) mobile communication, handover differs according to whether Xn interface is used between gNBs (namely base stations).

Figure 9:
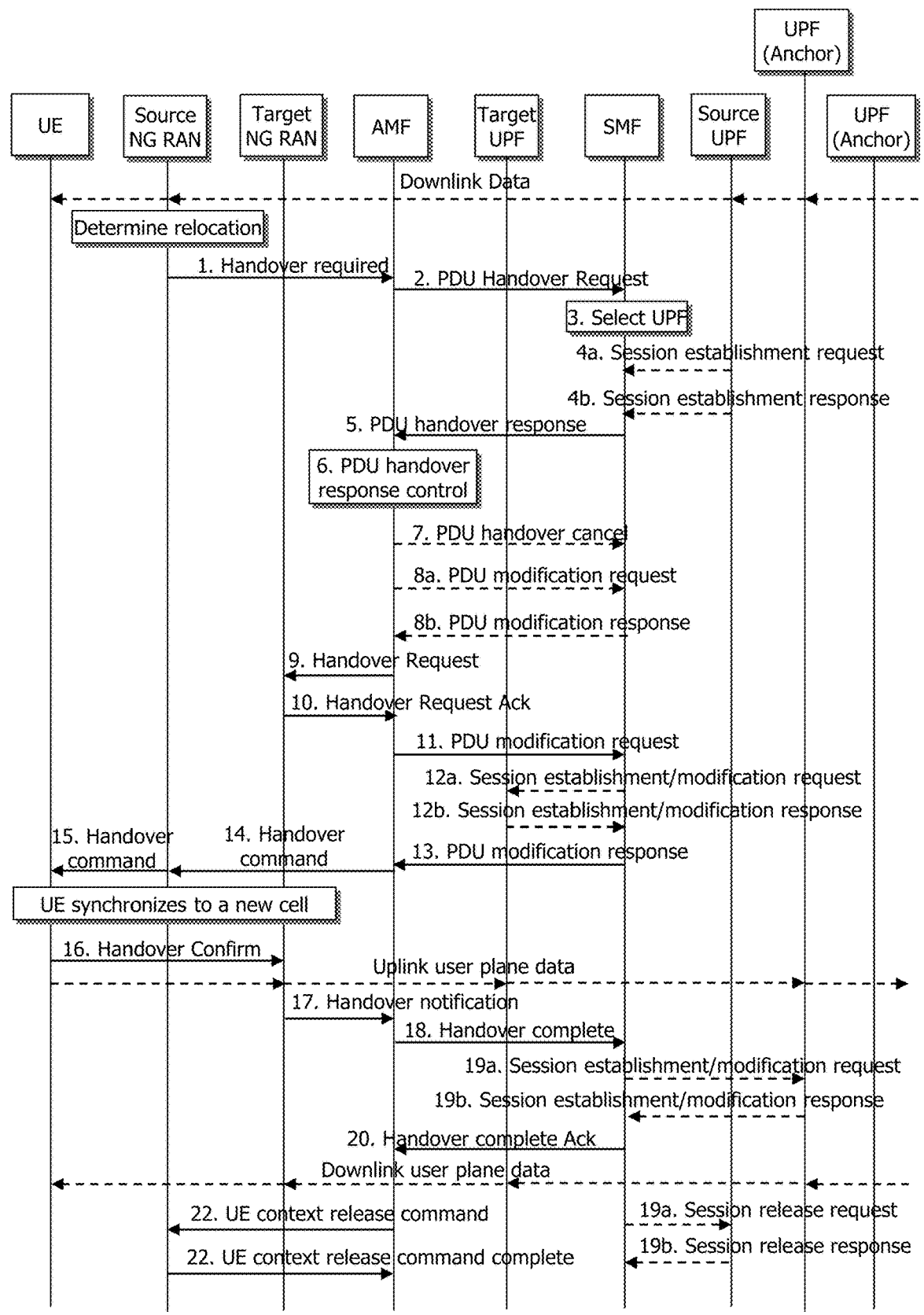
FIG. 9 is a flow diagram illustrating a handover procedure that does not use Xn interface.

FIG. 9 is a flow diagram illustrating a handover procedure that does not use Xn interface.

As may be seed from FIG. 9, if Xn interface is not used, a source NG-RAN transmits, to an AMF node, a message indicating that handover is required, and the AMF node transmits a PDU handover request message to an SMF node. As described above, if Xn interface is not used, handover is controlled by the AMF and SMF nodes.

Figure 10A:
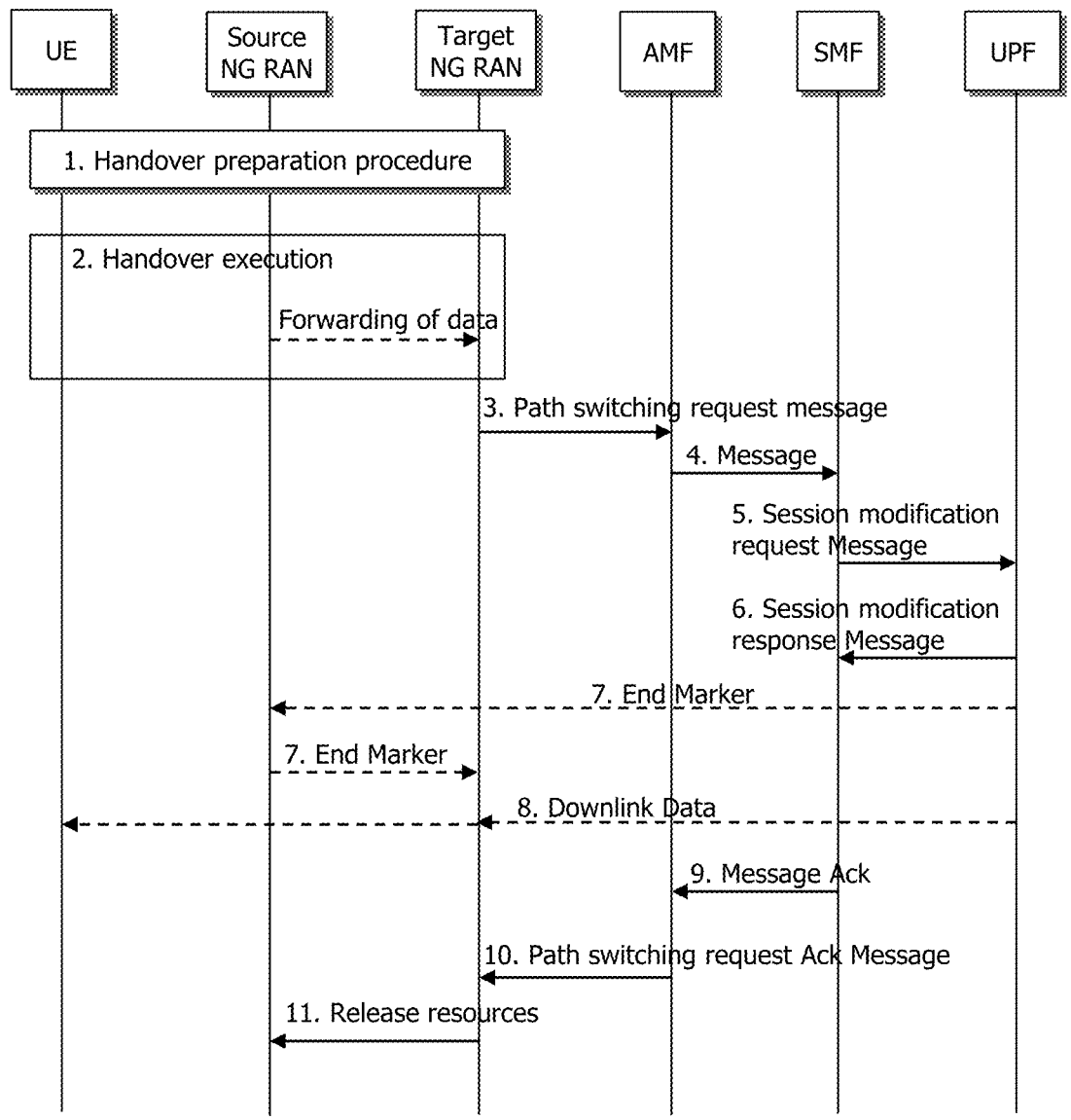
FIG. 10a is a flow diagram illustrating an example of a handover procedure that uses Xn interface, which is not accompanied by UPF relocation.
Figure 10B:
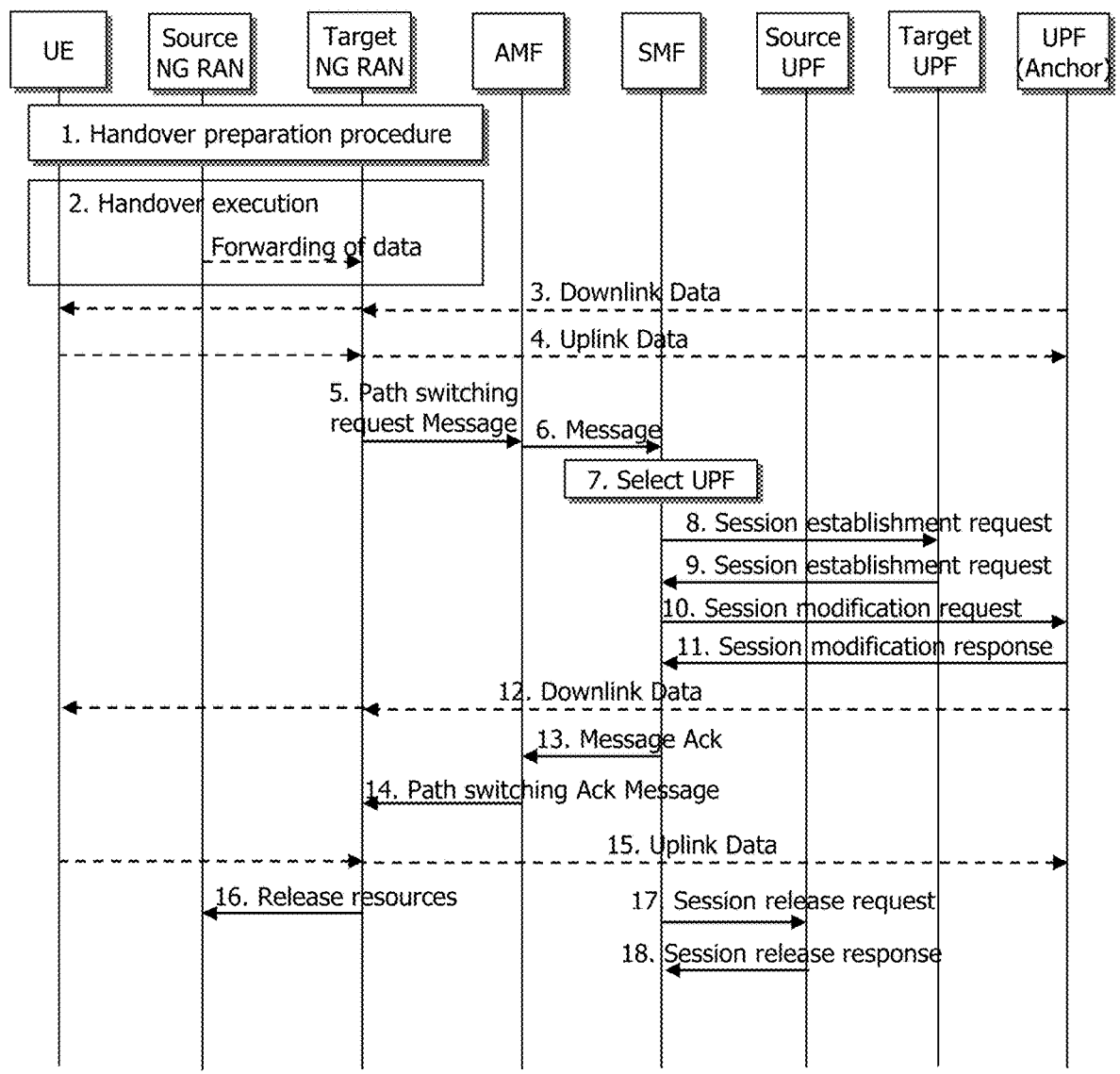
FIG. 10b is a flow diagram illustrating an example of a handover procedure that uses Xn interface, which is accompanied by UPF relocation.

FIG. 10a is a flow diagram illustrating an example of a handover procedure that uses Xn interface, which is not accompanied by UPF relocation, and FIG. 10b is a flow diagram illustrating an example of a handover procedure that uses Xn interface, which is accompanied by UPF relocation.

As may be known with reference to FIGS. 10a and 10b, if Xn interface is used, a handover procedure may be performed by a source NG-RAN and a target NG-RAN; and an AMF and SMF nodes may not control the handover procedure.

<Problems to be Considered with Respect to LADN Service>

If a UE enters a region in which the UE may access an LADN, an AMF node may provide LADN information to the UE. By using the LADN information, the UE may create a PDU session in the LADN. If the UE leaves the LADN region, the network may release the corresponding PDU session or release resources of the user plane. However, since an RAN is unable to determine whether the corresponding PDU session is intended for the LADN, if the UE leaves the LADN region while being in the CM-CONNECTED state, all PDU sessions may be handed over. If a handover procedure using Xn interface is performed, as shown in FIGS. 10a and 10b, since the handover procedure is performed without intervention of the core network (for example, the AMF and SMF nodes), the source NG-RAN does not know whether the corresponding PDU session is intended for the LADN. As a result, resources for all of the PDU sessions are transmitted from the source NG-RAN to the target NG-RAN. At this time, since radio resources for the LADN are also transmitted from the source NG-RAN to the target NG-RAN, the target NG-RAN performs radio resource reservation with respect to all of the PDU sessions including the LADN. The SMF node does not realize that the UE has left the LADN region until the target NG-RAN transmits a path switching request message to the core network (namely AMF node) after the handover procedure is completed. Since the UE has left the LADN region, the SMF node may perform an operation of releasing the corresponding PDU session or releasing resources of the user plane. As described above, since all of the PDU sessions for the LADN are transmitted to the target NG-RAN during a handover procedure using Xn interface, there is a problem that radio resources are unnecessarily wasted. More specifically, even if the UE has left the LADN region, since the target NG-RAN reserves radio resources of a PDU session for the corresponding LADN, resources are unnecessarily wasted.

Similarly, the same problem occurs when the UE located in a region allowed for a specific LADN moves into a non-allowed region. In other words, if handover using Xn interface is performed as the UE located in a region allowed for a specific LADN moves to a non-allowed region, the target NG-RAN first of all reserves radio resources for a PDU session of the corresponding LADN. However, the AMF and/or SMF node then releases the PDU session of the corresponding LADN or releases resources of the user plane.

As described above, if handover has to be performed through Xn interface, a problem occurs that PDU sessions for the LADN may unnecessarily be handed over to the target NG-RAN. Therefore, a method for solving the problem is needed.

Disclosure of the Present Specification

Therefore, the present disclosure is intended to provide a method for efficient management of a PDU session in the LADN.

More specifically, disclosures of the present specification provide the following methods for preventing PDU sessions for the LADN from being unnecessarily handed over to a target NG-RAN (namely a target gNB or a target cell) when a handover procedure using Xn interface is performed.

The present disclosures may be implemented by a combination of one or more methods described below.

1. First Disclosure: Method for Transmitting Region Information about a Specific PDU Session to a RAN by an SMF and/or AMF Node in a PDU Session Establishment Procedure If a PDU session is to be established, which may be serviced only in a specific region such as the LADN, an SFM and/or AMF node transmits service region information with respect to the corresponding PDU session during the session establishment procedure. The information may be formulated in the form of a Tracking Area (TA) list or a cell list. A source NG-RAN that has received the information (namely a source gNB or a source cell) may not transmit context with respect to the corresponding PDU session to the target NG-RAN when a UE leaves the service region indicated by the information so that reservation of radio resources for the PDU session is not performed while the corresponding PDU session is handed over. Similarly, before performing handover, the source NG-RAN may delete context with respect to the PDU session in advance or perform a procedure for releasing resources.

Also, in the existence of a UE leaving the service region indicated by the information, the source NG-RAN may not perform handover using Xn interface with respect to a PDU session of the UE. Instead, the source NG-RAN may perform handover controlled by the core network for the PDU session of the UE, such as handover without using Xn interface or handover using N2 interface.

Figure 11A:
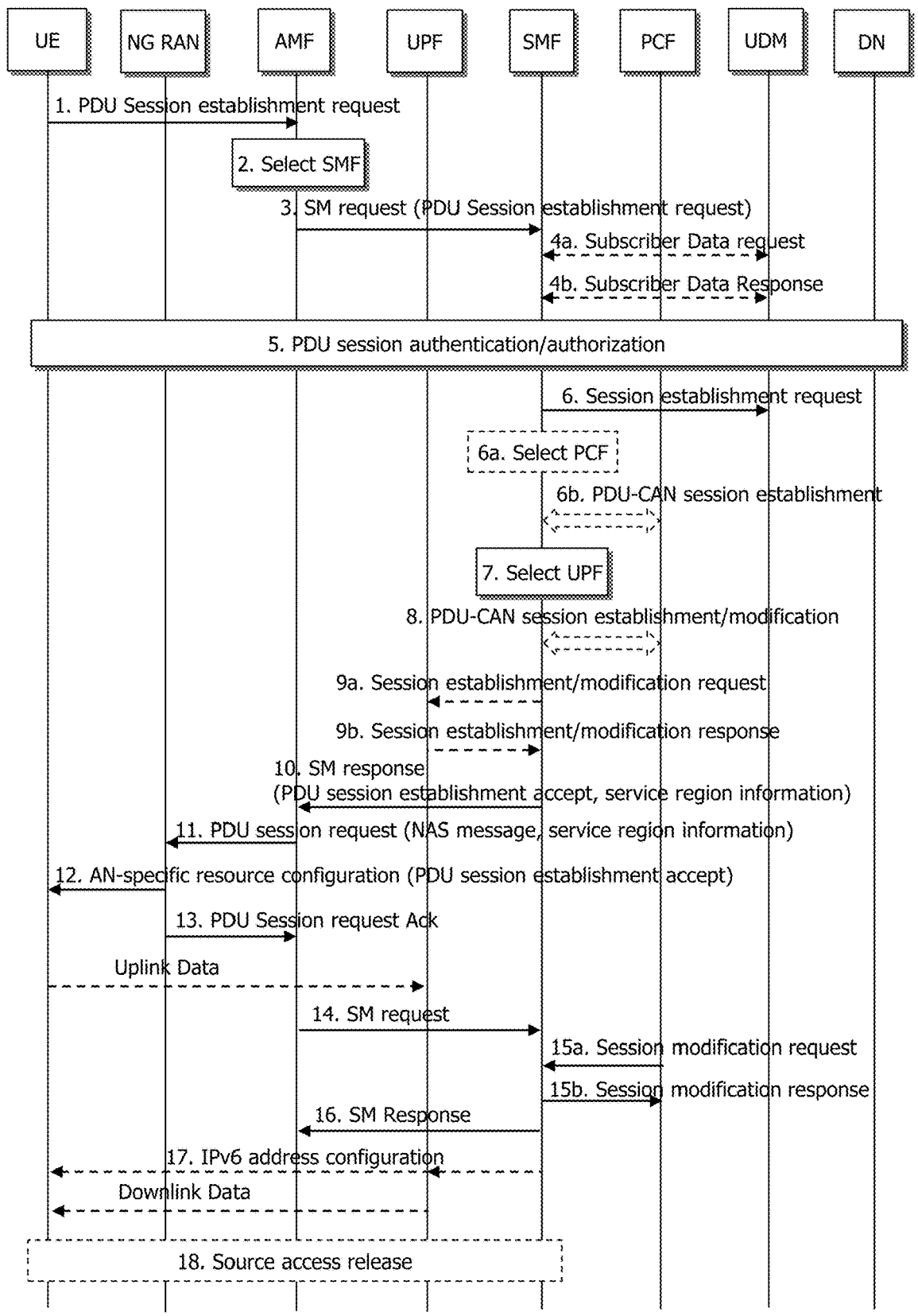
FIG. 11a illustrates a PDU session establishment procedure improved by a first disclosure of the present specification.

FIG. 11a illustrates a PDU session establishment procedure improved by a first disclosure of the present specification.

In the steps 10 and 11 of FIG. 11a, an SMF and/or AMF node may transmit, to the NG-RAN, service region information with respect to a PDU session, which is contained in the node. Here, the SMF may manage service regions of the LADN, and the AMF may manage allowed/non-allowed service regions. In this case, the SMF node may transmit information about service regions of the LADN to the NG-RAN. And the AMF node may transmit, to the NG-RAN, information about allowed/non-allowed service regions. However, contrary to the above, the AMF node may manage service regions of the LADN, and the SMF node may manage allowed/non-allowed service regions. In this case, the AMF node may transmit LADN service region information to the NG-RAN while the SMF node may transmit information about allowed/non-allowed service regions to the NG-RAN.

The allowed/non-allowed service regions may be applied separately for each UE. In this case, the corresponding information is not transmitted to the NG-RAN during the PDU session establishment procedure but may be transmitted to the NG-RAN during a registration procedure.

In case the NG-RAN receives both of the information about allowed/non-allowed service regions and information about LADN service regions, the NG-RAN may determine a region common to both of the information (namely intersection regions) as a service region and determine to perform handover of the PDU session of the UE.

Figure 11B:
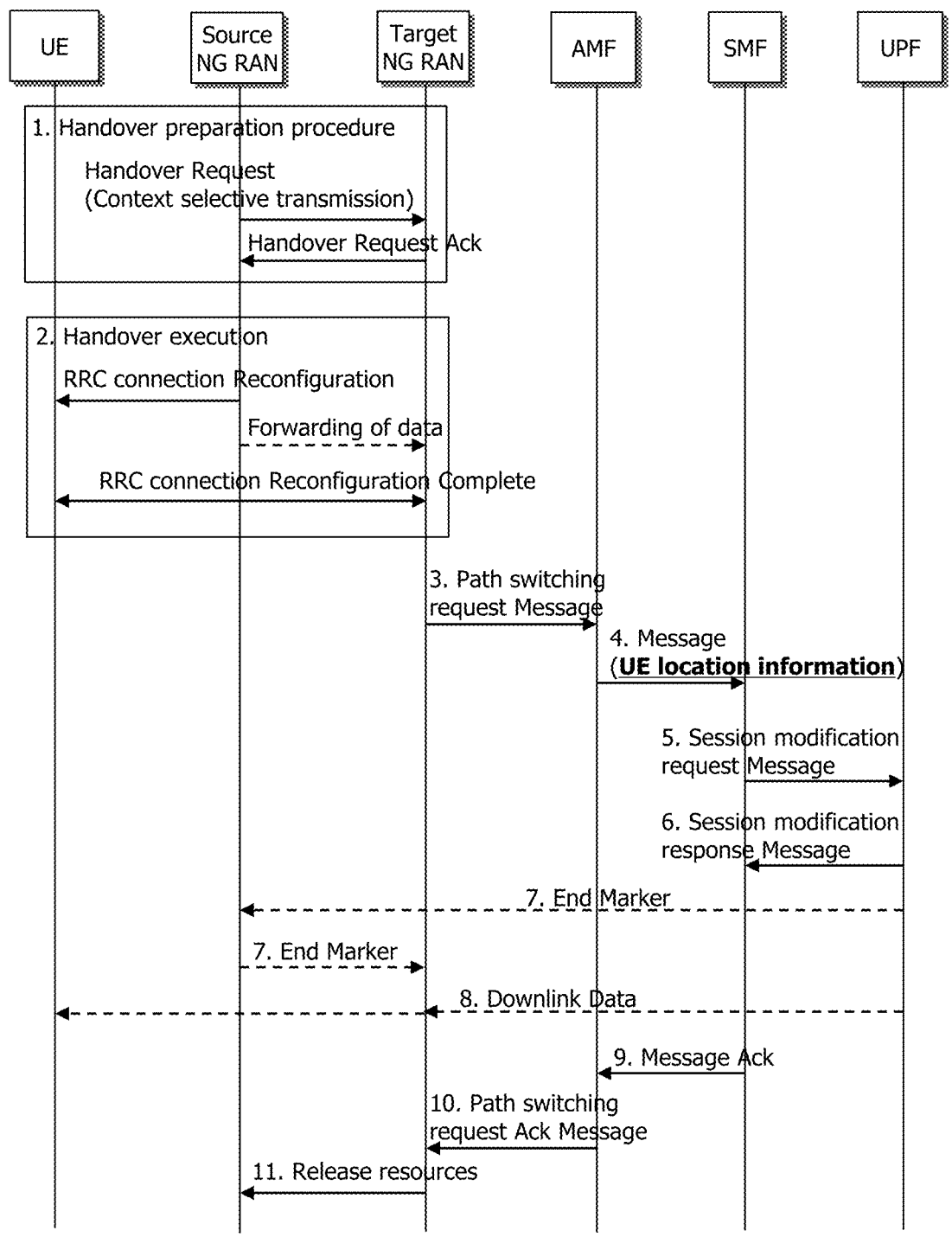
FIG. 11b illustrates a handover procedure that uses Xn interface improved by a first disclosure of the present specification.

FIG. 11b illustrates a handover procedure that uses Xn interface improved by a first disclosure of the present specification.

As shown in FIG. 11b, a source NG-RAN may selectively include context with respect to a PDU session while transmitting a handover request message to a target NG-RAN during a handover preparation process. For example, in case a UE moves into a service region with respect to the corresponding PDU session, the source NG-RAN may transmit context with respect to the PDU session by including the context into the handover request message. However, in case the UE has to be handed over to a target NG-RAN outside the service region with respect to the corresponding PDU session, the source NG-RAN may transmit context with respect to the PDU session without including the context in the handover request message.

As described above, in case the context is not included in the handover request message, the user plane with respect to the PDU session may be released. More specifically, if the AMF/SMF node determines, based on location information of the UE, that the UE has left a service region for the PDU session, the AMF/SMF node may release the corresponding PDU session of the UE or release resources of the user plane. The SMF node may obtain location information of the UE at the step 4.

II. Second Disclosure: Method for Transmitting an Indication to an NG-RAN by an SMF and/or AMF Node, which Instructs not to Perform a Handover Procedure Using Xn Interface During a PDU Session Establishment Procedure In the case of a PDU session that may be provided only in a specific service region such as the LADN, an SMF and/or AMF node transmits, to the NG-RAN during the procedure for establishing the PDU session, an indication that instructs not to perform a handover procedure using Xn interface (namely, an Xn-based handover procedure) with respect to the corresponding PDU session. In the following, the aforementioned operation will be described in more detail with reference to a related drawing.

Figure 12A:
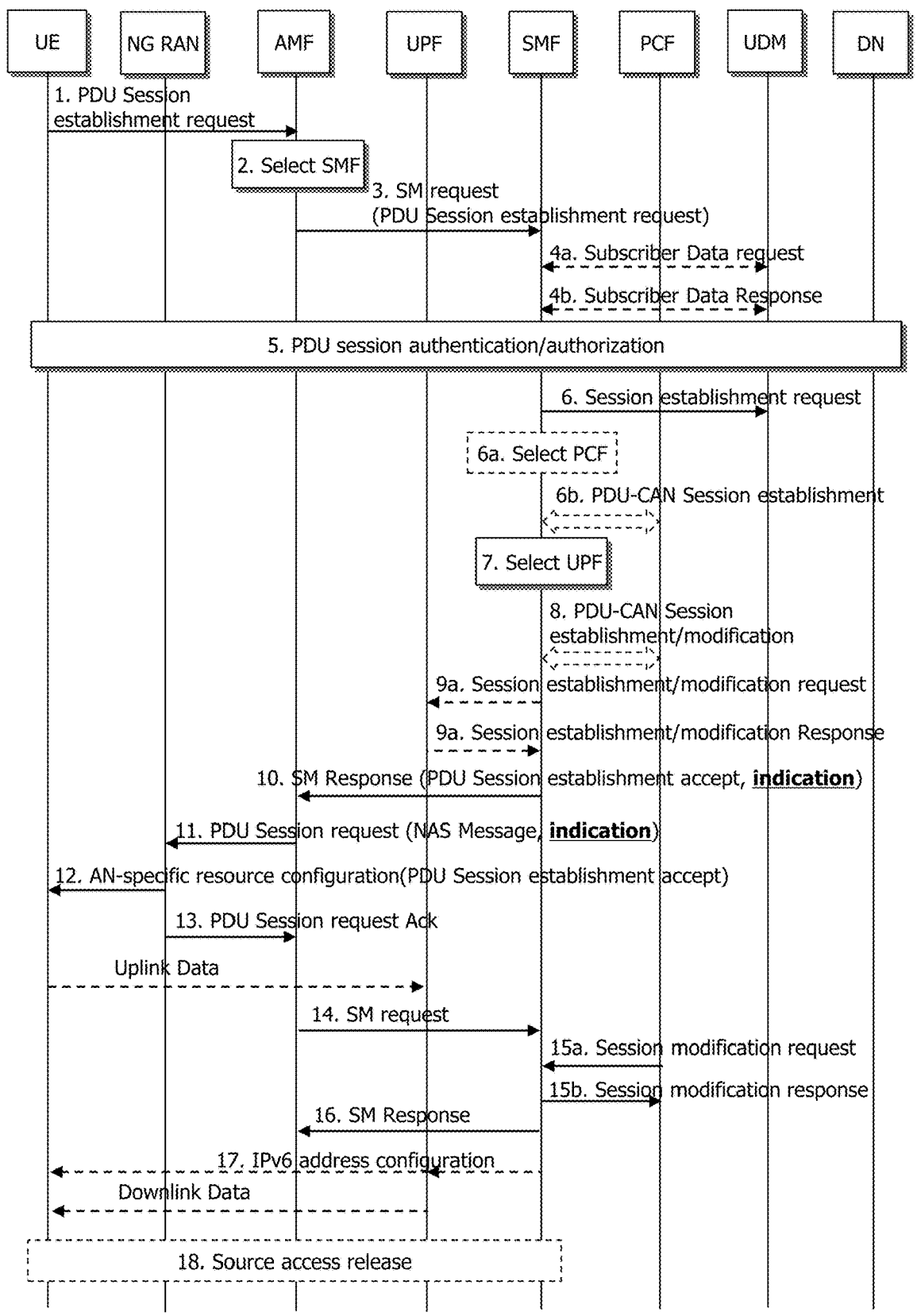
FIG. 12a illustrates a PDU session establishment procedure improved by a first disclosure of the present specification.

FIG. 12a illustrates a PDU session establishment procedure improved by a first disclosure of the present specification.

As may be known from the step 10 or 11 of the PDU session establishment procedure of FIG. 12a, an SMF and/or AMF node transmits, to the NG-RAN, an indication that instructs not to perform a handover procedure using Xn interface (namely, an Xn-based handover procedure) for the corresponding PDU session. The indication may be a 'without Xn handover indication', for example. Or the SMF and/or AMF node may transmit an indication that instructs to perform a handover procedure using N2 interface (namely, an N2-based handover procedure).

In case the UE enters a service region, the SMF and/or AMF may transmit a configuration to the NG-RAN, which allows Xn-based handover to be performed for the PDU session of the UE.

More specifically, in case the UE re-enters the service region during the registration procedure, the SMF and/or AMF node may transmit an indication to the NG-RAN, which again allows Xn-based handover. The indication may be transmitted during the registration procedure by being included in a registration accept message. More specifically, the indication may be transmitted by being included in a registration accept message during the registration procedure. Also, during the registration procedure, if the AMF node transmits information related to the UE location to the SMF node (namely, information notifying that the UE has entered a service region), the SMF node may transmit the indication to the NG-RAN via the AMF node.

Or the indication may be transmitted during the PDU session modification procedure.

The allowed/non-allowed service region may be applied separately for each UE. In this case, the corresponding information may not be transmitted to the NG-RAN during the PDU session establishment procedure but may be transmitted to the NG-RAN during the registration procedure.

In case the NG-RAN receives both of the information about allowed/non-allowed service regions and information about LADN service regions, the NG-RAN may determine a region common to both of the information (namely, an intersection region) as a service region and determine to perform handover of the PDU session of the UE.

Figure 12B:
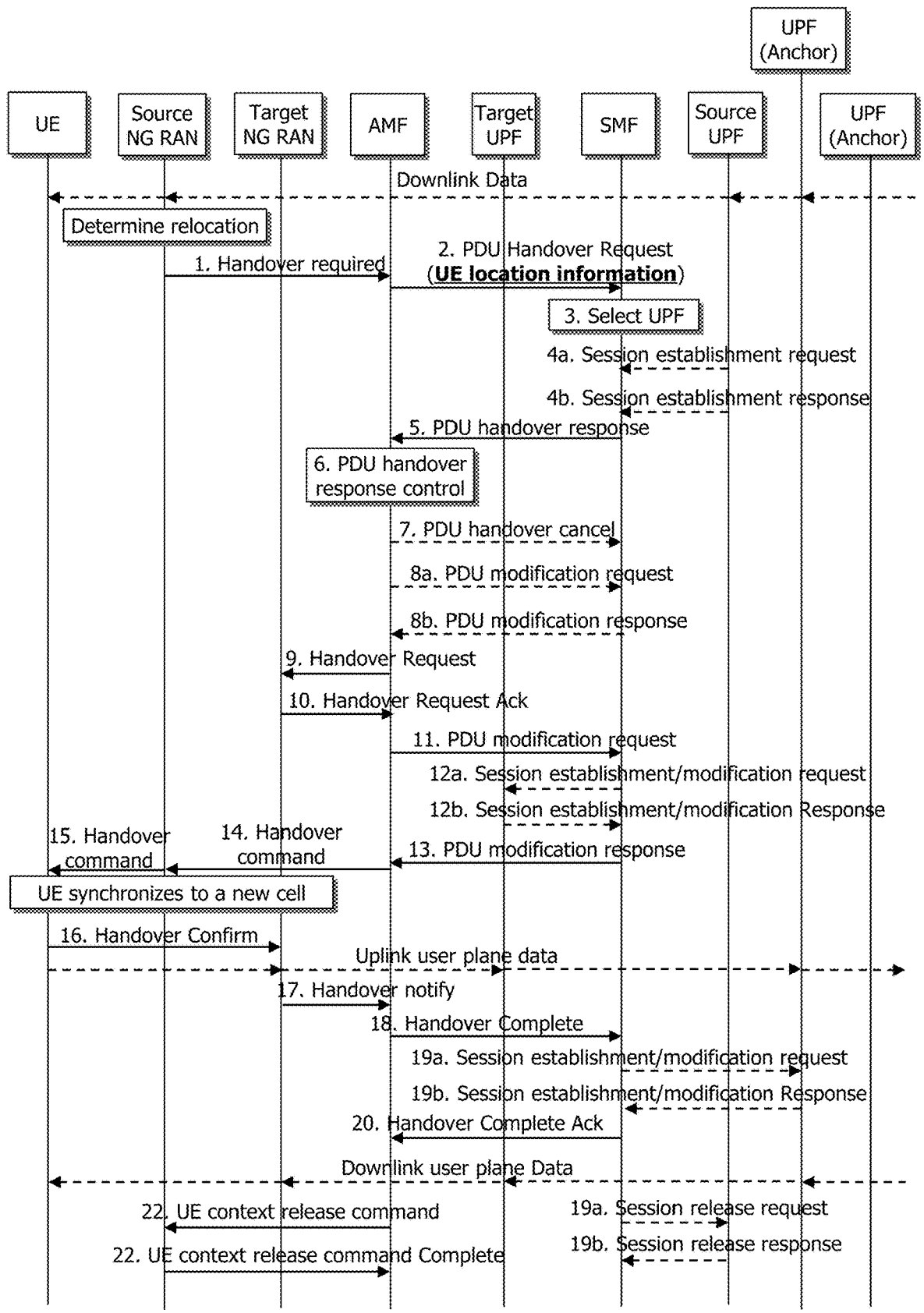
FIG. 12b illustrates an example of performing a handover procedure that does not use Xn interface, based on an indication according to a second disclosure of the present specification.

FIG. 12b illustrates an example of performing a handover procedure that does not use Xn interface, based on an indication according to a second disclosure of the present specification.

Receiving the aforementioned indication, the source NG-RAN may perform a handover procedure without involving Xn interface as shown in FIG. 12b. In this case, the AMF and/or SMF node may obtain location information of the UE at the steps 1 and 2 and perform release of resources with respect to the corresponding PDU session or perform release of resources of the user plane. According to one embodiment, at the step 1 shown, the source NG-RAN may transmit context with respect to the PDU session that may not be provided from the target NG-RAN by not including the context in a handover required message.

III. Third Disclosure: Method for Configuring an NG-RAN with a Handover Restriction List for Each PDU by SMF and/or AMF Node The AMF and/or SMF node may configure the NG-RAN with a handover restriction list (HRL) for each PDU session. In other words, for a PDU session such as the LADN that may be serviced in a specific service region, the SMF and/or AMF node may configure the NG-RAN by including a region that does not service the corresponding PDU session in a handover restriction list (HRL). The configuration may be performed during a PDU session establishment procedure or during a registration update procedure. Although the configuration may be performed on a UE basis during a normal registration procedure, the configuration may be performed for each PDU session during the PDU session establishment procedure or during the registration update procedure.

The NG-RAN is configured with a handover restriction list (HRL) for each PDU session. And based on the handover restriction list (HRL), the NG-RAN determines handover of the UE. If the UE moves to a restricted region indicated by the handover restriction list (HRL) configured with respect to the corresponding PDU session, the source NG-RAN may not transmit context with respect to the corresponding PDU session by not including the context in a handover request message or in a handover required message so that handover may not be performed for the corresponding PDU session.

In case the source NG-RAN is configured with multiple handover restriction lists (HRLs), the source NG-RAN selects a target NG-RAN or a target cell so that as many PDU sessions as possible may not be restricted by the HRL in performing handover. If there is no other choice but to hand over the UE to the target NG-RAN or target cell of a restricted region indicated by the handover restriction list (HRL), the target NG-RAN or target cell may be selected according to the priority mapped to each handover restriction list (HRL).

In case a PDU session is released, the NG-RAN may also delete the handover restriction list (HRL) associated with the corresponding PDU session.

Figure 13:
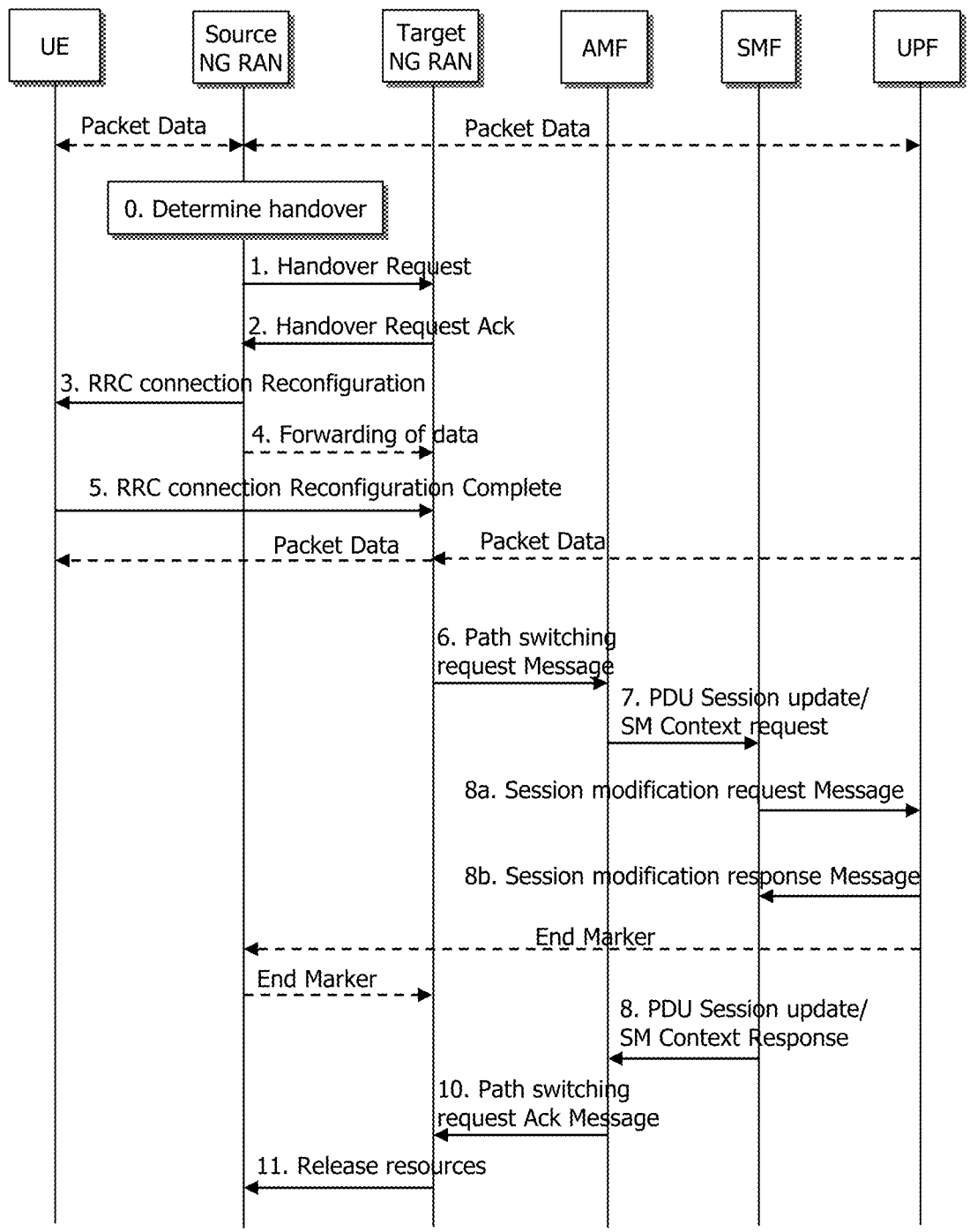
FIG. 13 illustrates a handover procedure according to a third disclosure of the present specification.

FIG. 13 illustrates a handover procedure according to a third disclosure of the present specification.

0) The source NG-RAN determines to perform handover based on a measurement report message received from the UE.

During this step, the source NG-RAN, based on its own handover restriction list (HRL) for each PDU session, may determine to which RAN or cell to hand over the UE. For example, rather than select a cell exhibiting the highest signal strength in a measurement report message received from the UE, the source NG-RAN may select, as a target cell, a cell with the highest signal strength from among the cells not indicated in the handover restriction list (HRL). In case no cell is available for handover among the cells not indicated in the handover restriction list (HRL), a target cell may be selected regardless of the handover restriction list (HRL).

If the UE has a plurality of PDU sessions, priority may be configured for each handover restriction list (HRL). In this case, a target cell may be selected so that as many PDU sessions as possible are not restricted by the handover restriction list (HRL) in performing handover. However, if it is the case that at least one of the handover restriction lists (HRLs) affects selection of a target cell, HRLs may be excluded one after the other from an HRL with the lowest priority, and the target cell may be selected as the one not indicated by a handover restriction list (HRL) with a possibly high priority.

To this purpose, the network may configure a priority for the case when handover is allowed together with a priority for a handover restriction list (HRL) with respect to each PDU session. In other words, a priority (namely service priority) for the case when handover is allowed for each PDU session and a priority (namely priority of the HRL) for the case when handover is not allowed may be configured separately. In this case, the source NG-RAN may consider priority of a handover restriction list (HRL) when selecting a target NG-RAN. In case the target NG-RAN is unable to service all of the PDU sessions transmitted from the source NG-RAN because of lack of resources and so on, a PDU session with a high service priority may be handled first, but a PDU session with a low service priority may not be handled at all.

1) The source NG-RAN transmits a handover request message to the target NG-RAN. The message may include the following parameters.

TABLE 2

| Parameter name | Description |
| --- | --- |
| Source NG-RAN node | Allocated at the source NG-RAN node |
| Target cell global ID | Includes E-UTRA CGI or NR CGI |
| UE context information | |
| List of PDU session resources to be set up | Includes UL tunnel information for each PDU session resource |
| RRC context | Includes a handover preparation information message |

As may be known from the table above, the message includes a list of PDU session resources to be set up. The list usually includes information about all of the PDU sessions provided by the source NG-RAN. However, if the target NG-RAN is unable to provide a part of PDU sessions because of a handover restriction list (HRL), the source NG-RAN may transmit the HRL by excluding information about the corresponding part of the PDU sessions within the handover restriction list. Meanwhile, the source NG-RAN may transmit handover restriction lists (HRLs) to the target NG-RAN. At this time, too, the source NG-RAN may transmit the handover restriction lists (HRLs) by excluding information about the HRLs with respect to the corresponding PDU sessions. However, the source NG-RAN may transmit, to the target NG-RAN, information about which PDU sessions are not handed over so that a list of PDU sessions that are rejected may be transmitted when the target NG-RAN transmits a path switching request message at the step 6 to be described later. 2) The target NG-RAN may determine, based on the information transmitted from the source NG-RAN, which PDU sessions to be serviced. And the target NG-RAN may transmit, to the source NG-RAN, an Ack message indicating that handover is available.

Similarly, in a different case, after the source NG-RAN transmits information about all of the PDU sessions and HRL at the step 1, the target NG-RAN itself may inform the source NG-RAN, at the step 2, about which service may be provided by determining from the handover restriction list (HRL). In this case, the target NG-RAN itself may generate a list of PDU sessions to be rejected.

3) The source NG-RAN performs an RRC connection reconfiguration procedure to hand over the UE.

4) The source NG-RAN starts forwarding of data to the target NG-RAN. At this time, forwarding is performed only for the PDU sessions allowed for handover rather than all of the PDU sessions.

5) The UE transmits an RRC connection complete message after being handed over to the target NG-RAN.

6) The target NG-RAN transmits, to the AMF node, a list of PDU sessions which have been successfully handed over and a list of rejected PDU sessions by including the lists in a path switching request message.

7-9) The AMF node transmits information for updating N3 tunnel information to the SMF nodes that manage PDU sessions which have been successfully handed over. The SMF node updates the N3 tunnel information through interaction with the UPF node. Also, the AMF node provides the SMF node that manages rejected PDU sessions with information about the corresponding PDU sessions. The SMF node may release or deactivate PDU sessions for which handover is not performed. If the AMF node does not receive, from the target NG-RAN, information about all of the PDU sessions known to the AMF node, the AMF node determines that the corresponding PDU sessions have not been handed over and informs the SMF node of the determination. The SMF node may release or deactivate the corresponding PDU sessions.

10) By transmitting a path switching request accept message to the target NG-RAN, the AMF node informs that handover has been successfully performed.

11) The target NG-RAN transmits a UE context release message to the source RAN. Then the source NG-RAN deletes context of the corresponding UE.

IV. Fourth Disclosure: Method for Transmitting a Measurement Report Selectively Based on Service Regions Known to the UE In the registration procedure, the UE receives LADN information or allowed/non-allowed region information and manages the received information. Therefore, based on the received information, when the UE performs a measurement report to the gNB, the UE may exclude the cells located outside service regions from the measurement report. By doing so, the UE may continue to stay in a service region. However, in case there are only those cells located outside the service regions, the UE may also have to perform a measurement report for the corresponding cells. Afterwards, if the UE leaves all of the service regions, a normal handover process may be performed.

Since the gNB knows its neighboring cells, if the gNB determines that the UE performs a measurement report again while not performing a measurement report with respect to a specific cell, the gNB may perform handover without using Xn interface rather than perform handover by using Xn interface.

The allowed/non-allowed service region may be applied separately for each UE. In this case, the corresponding information may be transmitted to the NG-RAN during the registration procedure rather than the PDU session establishment procedure.

In case the NG-RAN receives both of the information about allowed/non-allowed service regions and information about LADN service regions, the NG-RAN may determine a region common to both of the information (namely, an intersection region) as a service region and determine to perform handover of the PDU session of the UE.

What have been described so far may be implemented by hardware. The hardware implementation will be described with reference to a related drawing.

Figure 14:
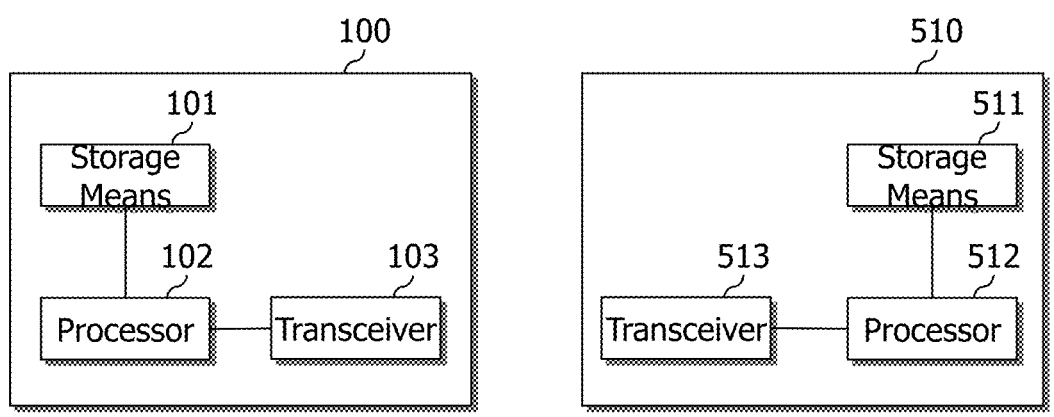
FIG. 14 illustrates block diagrams of a UE and a network node according to an embodiment of the present disclosure.

FIG. 14 illustrates block diagrams of a UE and a network node according to an embodiment of the present disclosure.

As shown in FIG. 14, the UE 100 comprises a storage means 101, a processor 102, and a transceiver 103. The network node may be an access network (AN), radio access network (RAN), AMF, CP functional node, or SME The network node may comprise a storage means 511, a processor 512, and a transceiver 513.

The storage means store the method described above.

The processors are configured to control the storage means and the transceivers. More specifically, the processors perform the methods stored in the storage means, respectively. And the processors are configured to transmit the signals described above through the transceivers.

In this document, preferred embodiments of the present disclosure have been described, but the technical scope of the present disclosure is not limited only to the specific embodiments. Therefore, the present disclosure may be modified, changed, or updated in various ways within the technical principles and scope defined by the appended claims.

What is claimed is:

1. A method for determining a handover of a Packet Data Unit (PDU) session, the method performed by a source cell and comprising:
   determining, by the source cell, a target cell or a target Next Generation Radio Access Network (NG-RAN) based on a measurement report of a user equipment (UE), wherein a handover region list is additionally considered in determining the target cell or the target NG-RAN; and
   transmitting, by the source cell, a handover request message that does not include context with respect to the PDU session to the target cell or the target NG-RAN, based on the handover region list and the determined target cell or target NG-RAN, when the determined target cell or target NG-RAN is unable to service the PDU session, in response to the PDU session not taking place within a region in which the PDU session is to be serviced,
   wherein the determining the target cell or target NG-RAN includes:
      confirming a handover region list with respect to each of a plurality of PDU sessions, based on presence of a plurality of handover region lists; and
      selecting a target cell or a target NG-RAN to which a plurality of PDU sessions are all handed over, based on the plurality of handover region lists.

2. The method of claim 1, wherein the PDU session is used for a Local Area Data Network (LADN).

3. The method of claim 1, wherein the handover request message is transmitted for a handover procedure using Xn interface.

4. The method of claim 1, wherein the handover region list is configured for each PDU session.

5. The method of claim 1, wherein the handover region list includes information about a region in which handover is limited or allowed with respect to the corresponding PDU session.

6. The method of claim 5, further comprising obtaining the handover region list from an Access and Mobility Management Function (AMF) or Session Management Function (SMF) node during a PDU session establishment procedure.

7. The method of claim 1, further comprising deleting context with respect to the PDU session, based on the handover region list, in response to confirming that the determined target cell or target NG-RAN is unable to service the PDU session.

8. The method of claim 1, wherein the plurality of handover region lists is confirmed in order of priority.

9. The method of claim 8, wherein, in the absence of a target cell or a target NG-RAN to which the plurality of PDU sessions is all handed over, a handover region list with a low priority is excluded from use.

10. A cell that determines handover of a Packet Data Unit (PDU) session, the cell comprising:
    a transceiver; and
    a processor determining a target cell or a target NG-RAN based on a measurement report of a user equipment (UE), wherein a handover region list is additionally considered in determining the target cell or the target NG-RAN,
    wherein the processor transmits a handover request message that does not include context with respect to the PDU session to the target cell or the target NG-RAN, based on the handover region list and the determined target cell or target NG-RAN, when the determined target cell or target NG-RAN is unable to service the PDU session, in response to the PDU session not taking place within a region in which the PDU session is to be serviced, and
    wherein the determining the target cell or target NG-RAN includes:
       confirming a handover region list with respect to each of a plurality of PDU sessions, based on presence of a plurality of handover region lists; and
       selecting a target cell or a target NG-RAN to which a plurality of PDU sessions are all handed over, based on the plurality of handover region lists.

* * * * *